H. D. CHURCH.
MOTOR VEHICLE.
APPLICATION FILED AUG. 6, 1913.
1,224,522.
Patented May 1, 1917.
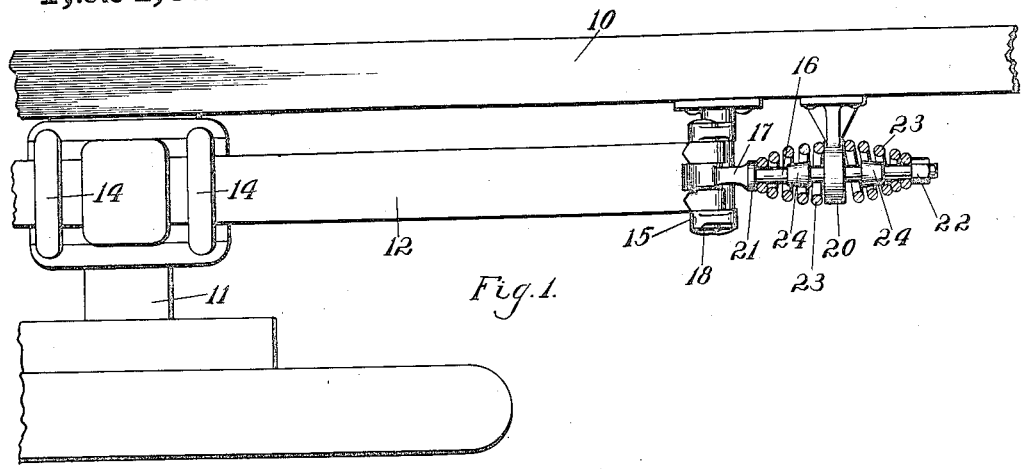
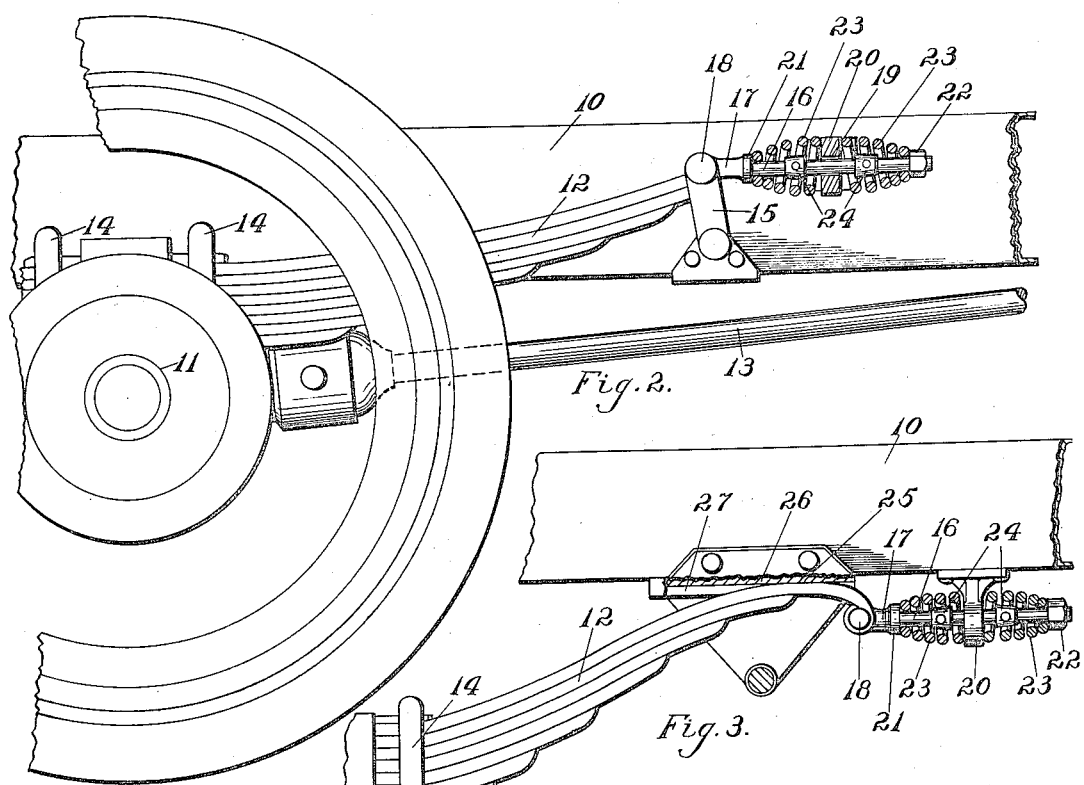
Witnesses:
Clair J. Cote,
E. Troat.
Inventor:
H. D. Church,
By Milton Tibbetts,
Attorney.

UNITED STATES PATENT OFFICE.

HAROLD D. CHURCH, OF DETROIT, MICHIGAN, ASSIGNOR TO PACKARD MOTOR CAR COMPANY, OF DETROIT, MICHIGAN, A CORPORATION OF MICHIGAN.

MOTOR-VEHICLE.

1,224,522. Specification of Letters Patent. Patented May 1, 1917.

Application filed August 6, 1913. Serial No. 783,374.

*To all whom it may concern:*

Be it known that I, HAROLD D. CHURCH, a citizen of the United States, and resident of Detroit, Wayne county, State of Michigan, have invented certain new and useful Improvements in Motor-Vehicles, of which the following is a specification.

This invention relates to motor vehicles, and particularly to the spring connection between the frame and the driving axle.

One of the objects of the present invention is to provide a motor vehicle with side springs connected to the axle and having a shackled connection to the frame at their forward ends, and also having a connection to the frame by which the longitudinal or driving thrust of the springs may be transmitted to the frame independently of the shackled connection.

Other objects of the invention will appear from the following description, taken in connection with the drawings in which, Figure 1 is a plan view of parts of one side of a motor vehicle embodying this invention;

Fig. 2 is a side elevation of the vehicle shown in Fig. 1;

Fig. 3 is a view similar to Fig. 2 showing another form of the invention.

Referring to the drawings, 10 represents one of the side bars of the vehicle frame and 11 is the axle, in the present instance the driving axle of the vehicle. This axle may be of either the bevel or worm gear type and driven by means of a propeller shaft 13 which extends forwardly to the motor and transmission mechanism.

The frame 10 is supported from the axle by means of side springs 12, one only of which is shown in the drawings, but it will be understood that the same spring construction is also arranged on the other side of the frame. The spring 12 is shown as secured between its end to the axle as by the spring clamps 14, and in Figs. 1 and 2 the forward end of the spring 12 is connected to the frame by means of a shackle 15. Of course, the rear end of the spring 12 is also suitably connected to the frame so that the latter is supported from the axle through these springs 12.

In some types of motor vehicles it is desirable to dispense with other connections than the side springs from the axle to the frame and the present invention is designed to permit this and yet take all of the drive from the axle 11 to the frame 10 through the spring 12. This is accomplished without sacrificing the shackle connection 15. A rod 16 having a clevis end 17 is connected to the forward end of the spring 12 by means of the bolt 18 which connects the spring to the shackle. This rod 16 is shown as extending forwardly from the bolt 18 through an opening 19 in a bracket 20 which is secured to the side of the frame 10. Abutments 21 and 22 are arranged at each end of the rod 16 and springs 23 are arranged between these abutments and the bracket 20. Thus, the forward end of the springs 12 is connected to the frame through a spring device which transmits the end or longitudinal thrusts of the spring to the frame. These end thrusts are, of course, due to the driving action of the axle 11.

For the purpose of limiting the action of the spring device stops 24 are provided on the rod 16 at each side of the bracket 20. Thus, the spring device becomes a rigid connection at predetermined points in the travel of the rod 16.

Now, referring to Fig. 3, it will be seen that a slightly modified form of connection is provided for the forward end of the springs 12. In this view the spring has a sliding connection at 25 with a plate 26 secured to the underside of the frame 10. Suitable flanges 27 prevent side movement of the forward end of the spring.

A spring device similar to that shown in Figs. 1 and 2 connects the forward end of the spring 12 at the bolt 18 with a suitable bracket 20 secured to the frame.

It is believed that the operation of the device is apparent from the above description and it will be understood that various modifications may be made from the details of the invention shown without departing from the spirit or scope of the claims.

Having thus described my invention, what I claim and desire to secure by Letters Patent, is:

1. In a motor vehicle, the combination with the frame and the axle, of a spring secured to the axle and extending forwardly therefrom, a sliding connection from the forward end of the spring to the frame to support the frame thereon, and a spring device to transmit the end thrusts of the spring to the frame.

2. In a motor vehicle, the combination with the frame and the driving axle, of a spring connected to the axle, and two independent means for connecting the spring to the frame, one of said means being adapted to support the frame on the spring and the other said means being adapted to transmit the driving thrusts of the spring to the frame.

3. In a motor vehicle, the combination with the frame and the driving axle, of a spring secured to the axle and extending forwardly therefrom, a shackle connection from the forward end of the spring to the frame, and a spring connection at one end of the spring adapted to transmit the drive from the spring to the frame and the pull from the frame to the spring.

4. In a motor vehicle, the combination with the frame and the driving axle, of a spring secured to the axle and extending forwardly therefrom, a shackle connection from the forward end of the spring to the frame, and a spring device connecting said spring and frame to transmit the drive thereof, said device having stops coöperating with said frame whereby the thrusts are positively taken at predetermined positions of the spring.

5. In a motor vehicle, the combination with the frame and the axle, of a spring secured to the axle and extending forwardly therefrom, a shackle connection from the forward end of the spring to the frame, a bracket on the frame forward of the shackle, a rod connected to the forward end of the spring and passing through an opening in said bracket, abutments on said rod on both sides of said bracket, and springs between said bracket and said abutments.

In testimony whereof I affix my signature in the presence of two witnesses.

HAROLD D. CHURCH.

Witnesses:
  E. B. KNAP,
  LE ROI J. WILLIAMS.